US008671919B2

(12) United States Patent
Nakasugi et al.

(10) Patent No.: US 8,671,919 B2
(45) Date of Patent: Mar. 18, 2014

(54) INTAKE DEVICE OF ENGINE

(71) Applicant: Mazda Motor Corporation, Hiroshima (JP)

(72) Inventors: Tatsuro Nakasugi, Hiroshima (JP);
Fusatoshi Tanaka, Hiroshima (JP);
Takao Kadoishi, Hiroshima (JP);
Nozomu Hachiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/737,765

(22) Filed: Jan. 9, 2013

(65) Prior Publication Data

US 2013/0180507 A1    Jul. 18, 2013

(30) Foreign Application Priority Data

Jan. 17, 2012   (JP) ................................. 2012-007434

(51) Int. Cl.
*F02B 33/00* (2006.01)
(52) U.S. Cl.
USPC .............................. 123/563; 123/542; 60/599
(58) Field of Classification Search
CPC .. F02B 29/04; F02B 29/0406; F02B 29/0437; F02B 29/0443
USPC ............... 123/540, 542, 563, 568.11, 568.12, 123/568.15, 184.21, 184.38, 184.42, 123/184.61; 60/599
See application file for complete search history.

(56) References Cited

U.S. PATENT DOCUMENTS

| 4,104,999 | A | * | 8/1978 | Ullrich | 123/563 |
| 4,273,082 | A | * | 6/1981 | Tholen | 123/41.31 |
| 4,303,052 | A | * | 12/1981 | Manfredo et al. | 123/563 |
| 6,293,264 | B1 | * | 9/2001 | Middlebrook | 123/563 |
| 6,311,676 | B1 | * | 11/2001 | Oberg et al. | 123/563 |
| 8,286,615 | B2 | * | 10/2012 | Dehnen et al. | 123/542 |

FOREIGN PATENT DOCUMENTS

WO   2009/003562 A1   1/2009

* cited by examiner

*Primary Examiner* — Hung Q Nguyen
(74) *Attorney, Agent, or Firm* — Studebaker & Brackett PC

(57) ABSTRACT

An intake device of an engine comprises an intake manifold of a four-cylinder inline engine and a water-cooling type of intercooler. The intake manifold includes a downstream branch pipe portion connecting to cylinders, a chamber portion connecting to the downstream branch pipe portion, and an upstream intake pipe portion connecting to the chamber portion. A rectangular opening portion having a vertically-long shape is formed at the upstream intake pipe portion. The intercooler includes an intercooler body portion having a pair of faces which has the widest face-area and faces to each other in an engine width direction. The intercooler body portion is installed in the chamber portion, by being inserted through the rectangular opening portion, so as to divide an inside of the chamber portion into two parts in the engine width direction thereby.

4 Claims, 15 Drawing Sheets

INTAKE DEVICE OF ENGINE

BACKGROUND OF THE INVENTION

The present invention relates to an intake device of an engine having plural cylinders arranged in a line, and in particular relates to an intake device of an engine comprising a water-cooling type of intercooler which is installed in an intake manifold.

As the temperature of intake air of an internal combustion engine becomes lower, the mass of the intake air per a unit volume becomes more (the charging efficiency increases). Accordingly, for the engine equipped with a supercharger, an intercooler to cool the intake air compressed by the supercharger may be necessary for increasing the charging efficiency.

Herein, a water-cooling type of intercooler may be more desirable than an air-cooling type of intercooler from viewpoints of the cooling efficiency. Also, it may be desirable to install such an intercooler in an intake-system component for a properly-compact engine room which can provide a roomy vehicle compartment. PCT Patent Application Publication No. WO2009003562A1, for example, discloses an intake device, in which a water-cooling type of intercooler having a laterally-long shape is installed in an intake manifold including a branch pipe portion connecting to respective cylinders and a chamber portion arranged upstream of the branch pipe portion so as to vertically partition a space inside the chamber portion into upper and lower parts.

According to the intake device disclosed in the above-described patent document, there may be no need of arranging another water-cooling type of intercooler in an engine room additionally. Therefore, this device may be more advantageous than an intake device in which no intercooler is installed in the intake manifold in order to provide the properly-compact engine room.

However, the intercooler of the above-described patent document partitions the space inside the chamber portion vertically, in other words, this intercooler is provided such that its intake-air passing faces face to each other in a vertical direction. Accordingly, in order to ensure the area of the intake-air passing faces effectively, it may necessary to make the intercooler expand in an engine longitudinal direction or an engine width direction. Therefore, the intercooler of the above-described patent document is configured to have the laterally-long shape, so that it may have some problem from viewpoints of the compactness in the engine longitudinal direction and the engine width direction.

SUMMARY OF THE INVENTION

The present invention has been devised in view of the above-described matters, and an object of the present invention is to provide an intake device of an engine comprising a water-cooling type of intercooler installed in an intake manifold which can properly achieve the compactness in the engine longitudinal direction and the engine width direction, ensuring the area of the intake-air passing faces effectively.

According to the present invention, there is provided an intake device of an engine, comprising an intake manifold of the engine having plural cylinders arranged in a line, the intake manifold being provided at an outer face of an intake side of the engine which is one side in an engine width direction, the intake manifold including a downstream branch pipe portion connecting to the respective cylinders, a chamber portion positioned below the downstream branch pipe portion and connecting to the downstream branch pipe portion, and an upstream intake pipe portion connecting to an engine-outer-face-side portion of the chamber portion and extending in an engine longitudinal direction which corresponds to an arrangement direction of the plural cylinders, the chamber portion having a rectangular opening portion having a vertically-long shape which is formed at an opposite side thereof to the upstream intake pipe portion, and a water-cooling type of intercooler including an intercooler body portion, the intercooler body portion having a rectangular-parallelepiped shape and a pair of faces which has the widest face-area and faces to each other in the engine width direction, wherein the intercooler body portion of the intercooler is installed in the chamber portion of the intake manifold, by being inserted through the opening portion of the chamber portion, so as to divide an inside of the chamber portion into two parts in the engine width direction thereby.

According to the present invention, since the intercooler body portion having the rectangular-parallelepiped shape has a pair of faces which has the widest face-area and faces to each other in the engine width direction, the properly-wide area can be ensured in a vertical direction which has less restriction in space for the compactness of the engine room, compared with the engine longitudinal direction or the engine width direction. Thereby, the length or width of the intercooler can be properly restrained from being improperly long or wide, ensuring the desired area.

Further, since the intercooler body portion is installed in the chamber portion so as to divide the inside of the chamber portion into two parts in the engine width direction, in other words, such that the inside of the chamber portion can be partitioned by the widest face, an intake-air flow having a high temperature passes through this widest area, thereby ensuring the intake-air passing area effectively.

Thus, the intercooler body portion of the water-cooling type of intercooler which is made compact in the engine longitudinal and width directions is installed in the intake manifold, by being inserted through the opening portion of the chamber portion, so that the compactness of a whole of the intake device comprising the water-cooling type of intercooler and the intake manifold in the engine longitudinal and width directions can be achieved.

Accordingly, the above-described intake device of an engine comprising the water-cooling type of intercooler installed in the intake manifold can properly achieve the compactness in the engine longitudinal direction and the engine width direction, ensuring the area of the intake-air passing faces effectively.

According to an embodiment of the present invention, the intake manifold is made from resin, the intercooler is fixedly fastened to a peripheral portion of the opening portion of the intake manifold, and a throttle body is connected to the upstream intake pipe portion of the intake manifold. In general, in a case in which the throttle body is connected to the upstream intake pipe portion extending from the intake manifold, the gravity center of the whole of the intake manifold including the throttle body is located at an offset position toward the side of throttle body. When the engine vibrates, the intake manifold and the throttle body vibrate as well. Herein, the intake manifold vibrates considerably due to the above-described imbalance of the gravity center, so that it may be necessary to reinforce the intake manifold by increasing the thickness thereof or the number of reinforcing ribs. This necessity may be higher for a resin-made intake manifold, compared with a metal-made intake manifold. Accordingly, despite using the resin-made intake manifold for a lightweight, the weight increase may be properly avoided by the above-described increase of the thickness and ribs.

According to the above-described embodiment, however, since the intercooler is fixedly fastened to the peripheral portion of the rectangular opening portion formed at the opposite side of the chamber portion to the upstream intake pipe portion, the gravity center of the whole of the intake manifold including the throttle body and the water-cooling intercooler can be located closer to the gravity center of the intake manifold itself than a case in which only the throttle body is connected to the intake manifold. Thereby, the vibration caused by the imbalance can be properly restrained, so that any further reinforcement may not be necessary, thereby avoiding the weight increase of the intake manifold for reinforcement.

According to another embodiment of the present invention, the chamber portion and the downstream branch pipe portion of the intake manifold are interconnected to each other via a single intermediate intake pipe portion which curves outward in the engine width direction and extends vertically, and an EGR-gas introduction pipe is connected to an outside wall portion of the intermediate intake pipe portion which is located at an outside position in the engine width direction.

According to the above-described embodiment, since the EGR-gas introduction pipe is connected to the outside wall portion of the intermediate intake pipe portion which interconnects the chamber portion and the downstream branch pipe portion, the EGR gas is introduced downstream of the intercooler body portion, so that the performance of the intercooler can be restrained from being deteriorated by soot contained in the EGR gas.

The flow of the intake air passing through the intercooler body portion in the chamber portion goes up to the downstream branch pipe portion in the intermediate intake pipe portion. Herein, since the intermediate intake pipe portion curves outward in the vehicle width direction, this intake flow goes up along an inner face of the outside wall portion (being directed outward in the intermediate intake pipe portion) when the intake-flow amount is relatively small. Further, since the EGR-gas introduction pipe is connected to the outside wall portion, in other words, the EGR gas is introduced to the vicinity of the outside wall portion, the intake-air flow going up in the intermediate intake pipe portion along the outside wall portion is easily mixed with the introduced EGR gas, thereby promoting mixing of the EGR gas. Meanwhile, when the intake-flow amount is relatively large, the intake air flows, spreading inside the intermediate intake pipe portion, so that the mixing of the EGR gas can be kept appropriate.

Other features, aspects, and advantages of the present invention will become apparent from the following description which refers to the accompanying drawings.

DETAILED DESCRIPTION OF THE INVENTION

Hereafter, a preferred embodiment of the present invention will be described referring to an example.

Figure 1:
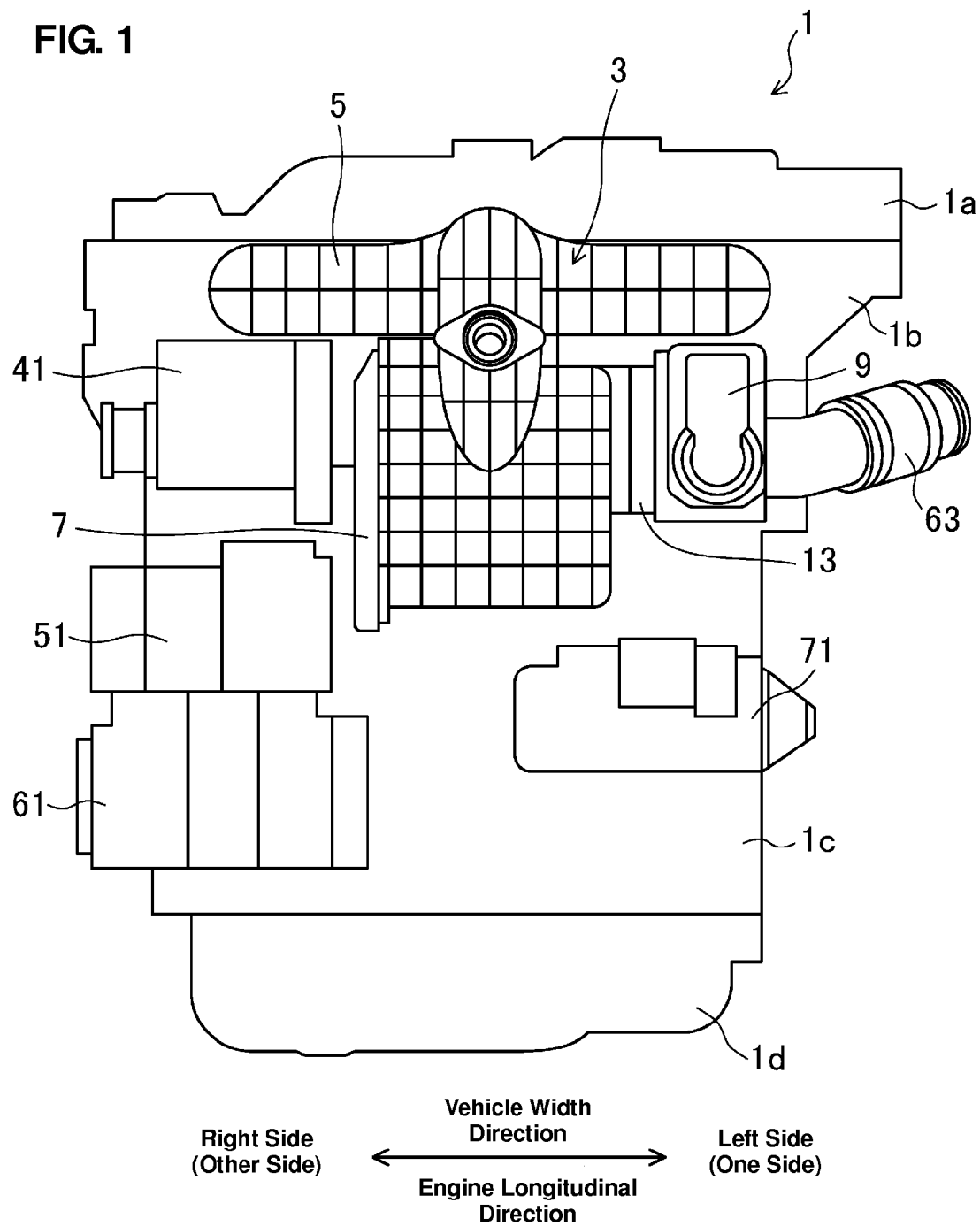
FIG. 1 is an elevational view of an engine to which an intake device according to an embodiment of the present invention is applied.

FIG. 1 is an elevational view of an engine to which an intake device according to an embodiment of the present invention is applied. An engine 1, which is a diesel engine, comprises a cylinder block 1c which has four cylinders 11a, 11b, 11c, 11d arranged in a line (see FIG. 2), an oil pan 1d which is provided at a lower portion of the cylinder block 1c, a cylinder head 1b which is attached to an upper face portion of the cylinder block 1c, and a head cover 1a which is attached to an peripheral portion of an upper face of the cylinder head 1b. This engine 1 is installed to a front-engine front-drive type of vehicle, which is provided in an engine room such that the four cylinders 11a, 11b, 11c, 11d are arranged in a vehicle width direction. Thus, this engine 1 is a so-called lateral-arrangement four-cylinder inline engine.

Accordingly, an engine longitudinal direction, i.e., an arrangement direction of the four cylinders 11a, 11b, 11c, 11d, substantially corresponds to the vehicle width direction, and an engine width direction substantially corresponds to a vehicle longitudinal direction. Hereinafter, in general, a front side means one side in the engine width direction (a front side in the vehicle longitudinal direction), a rear side means the other side in the engine width direction (a rear side in the vehicle longitudinal direction), a left side means one side in the engine longitudinal direction (a left side in the vehicle width direction), and a right side means the other side in the engine longitudinal direction (a right side in the vehicle width direction).

Further, an intake system (an intake device 3) is connected to the front side of the engine 1, and an exhaust system is connected to the rear side of the engine 1. Thus, the engine 1 is a so-called front-intake rear-exhaust engine. Moreover, some auxiliary components, such as an alternator 41 to generate the alternating current, a water pump 51, an air compressor for air conditioning 61, and a starter motor 71 to start the engine 1, are provided at an outer face of the intake side of the engine 1 of the present embodiment, in addition to the above-described intake system.

The intake device 3 of the present embodiment comprises an intake manifold 5 which is provided at the outer face of the intake side of the engine 1 which is located on the left side of the alternator 41, an intercooler 7 which is installed in the intake manifold 5, an intake control-valve unit 9 which is provided upstream of the intake manifold 5, and a spacer member 13 which is provided between the intake control-valve unit 9 and the intake manifold 5 and connect these members. An intake duct 63 is connected upstream of the intake control-valve unit 9.

Figure 2:
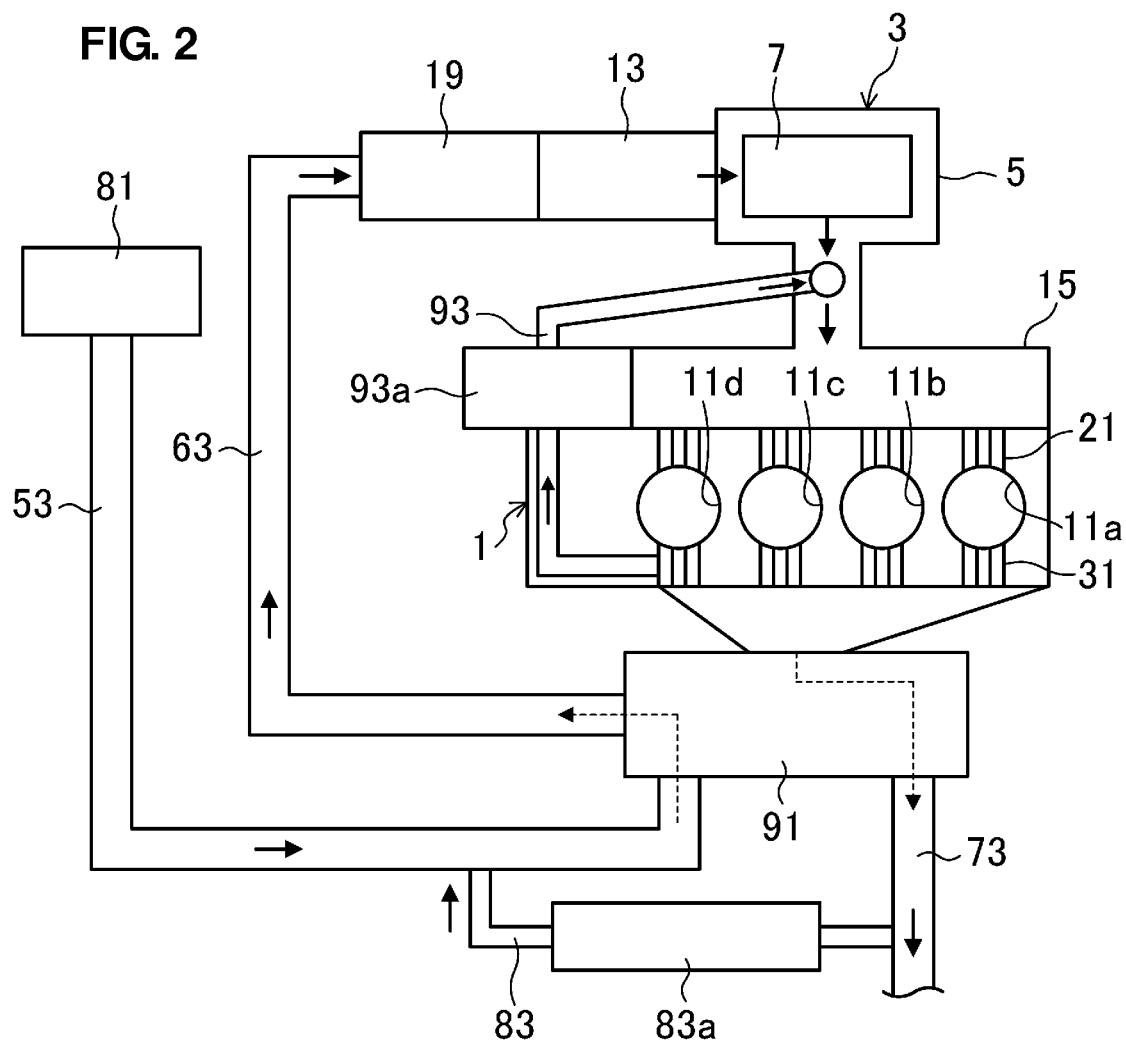
FIG. 2 is a schematic entire view showing the engine and an intake system.

A whole of the intake system is shown in FIG. 2. An air cleaner 81 coupled to an air duct, not illustrated, and a compressor chamber (not illustrated) of a supercharger (turbo charger) 91 are interconnected via an intake duct 53. The supercharger 91 and a throttle body 19 of the intake control-valve unit 9 are interconnected via the intake duct 63. The throttle body 19 and the intake manifold 5 equipped with the intercooler 7 installed therein are interconnected via the spacer member 13. A downstream branch pipe 15 of the intake manifold 5, which will be described later, is connected to respective intake ports 21 formed at the cylinders 11a, 11b, 11c, 11d of the engine 1. Respective exhaust ports 31 formed at the cylinders 11a, 11b, 11c, 11d of the engine 1 are connected to a turbine chamber (not illustrated) of the supercharger 91. The intake duct 63 and an exhaust duct 73 are interconnected via a recirculation passage 83 equipped with an EGR cooler 83a provided therein. The intake manifold 5 and the exhaust ports 31 are interconnected via an EGR-gas introduction pipe 93 equipped with an EGR valve 93a provided therein.

According to the above-described intake system of the present embodiment, fresh air which is purified by the air cleaner 81 and the EGR gas which is circulated from the exhaust duct 73 and cooled by the EGR cooler 83a are mixed at the intake duct 53, and this mixed gas (intake air) is supplied to the compressor chamber of the supercharger 91 and compressed therein. The compressed intake air having a high temperature flows into the intake control-valve unit 9, passing through the intake duct 63, goes down through the throttle body 19 and the spacer member 13, and finally reaches the intake manifold 5. The intake air cooled by the inter cooler 7 in the intake manifold 5 is further mixed with part of the exhaust gas which is exhausted from the exhaust pipes 31 and introduced into the intake manifold 5 via the EGR-gas introduction pipe 93, and then supplied and distributed to the intake ports 21. The intake air becomes the exhaust gas after its combustion. Part of the exhaust gas is introduced into the intake manifold 5 via the EGR-gas introduction pipe 93, and the rest of the exhaust gas is supplied to the turbine chamber of the supercharger 91 and rotates a turbine, not illustrated, finally exhausts through the exhaust duct 73.

Figure 3:
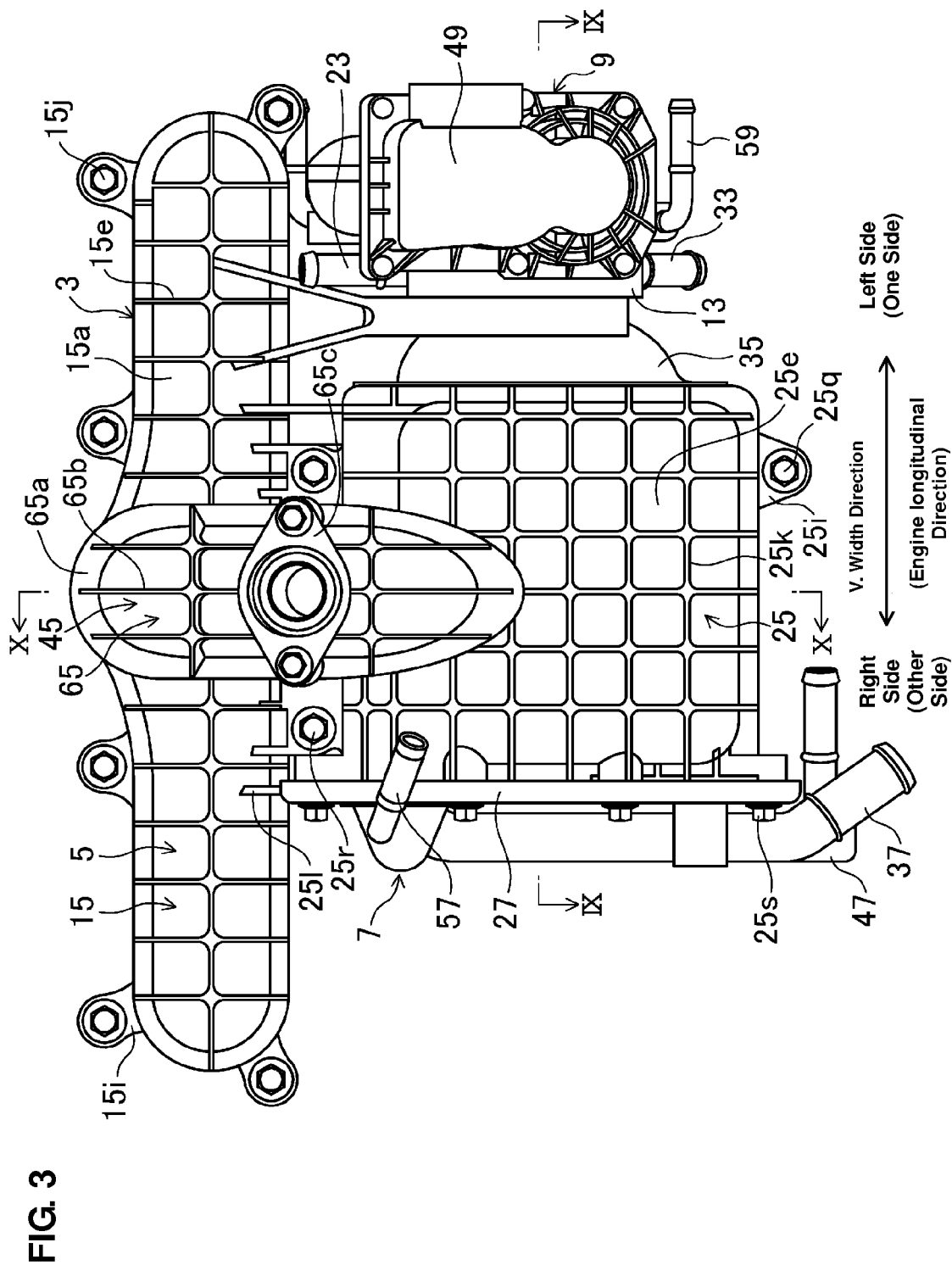
FIG. 3 is an elevational view of the intake device.
Figure 4:
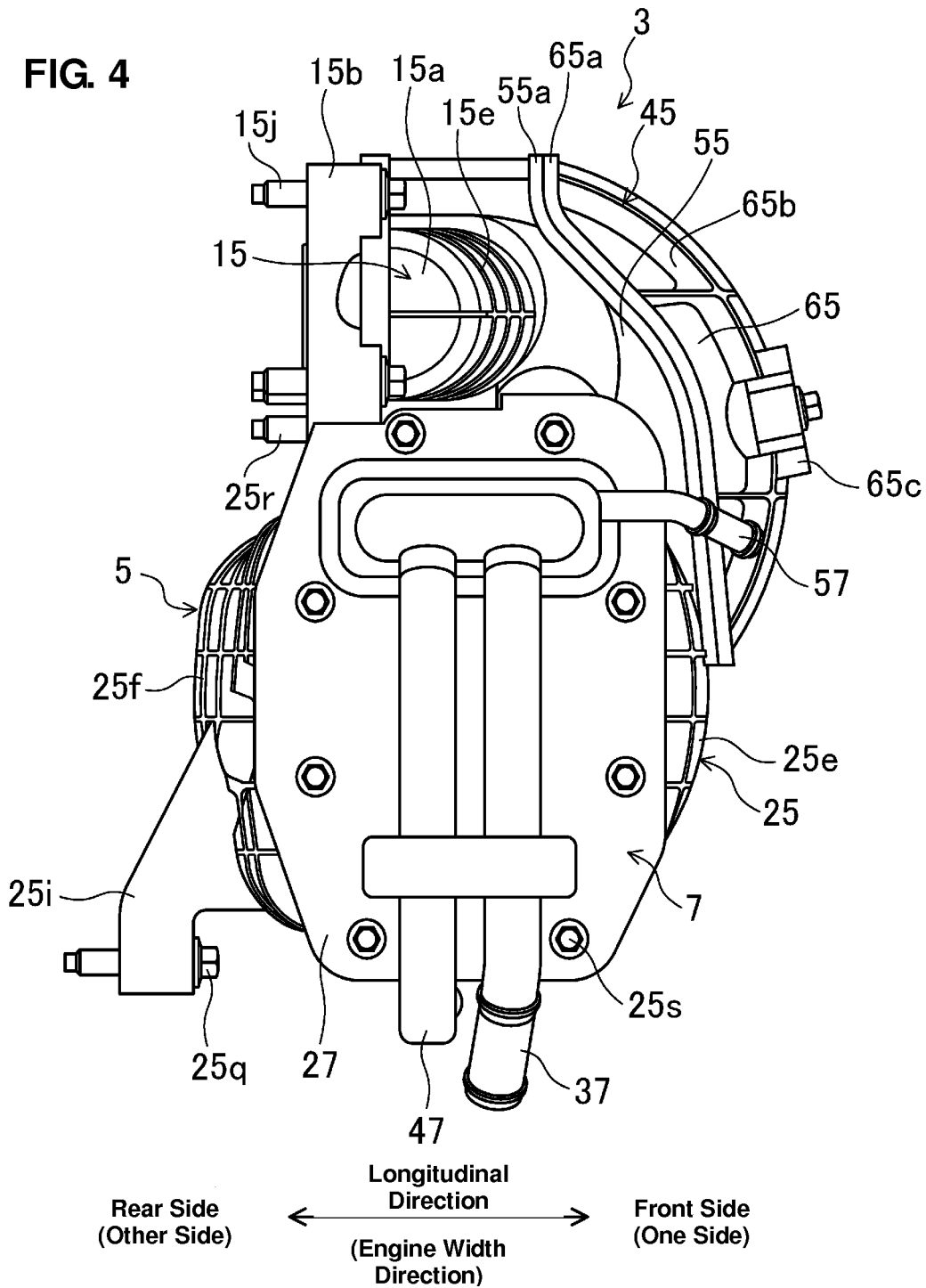
FIG. 4 is a side view of the intake device, when viewed from the other side in an engine longitudinal direction.
Figure 5:
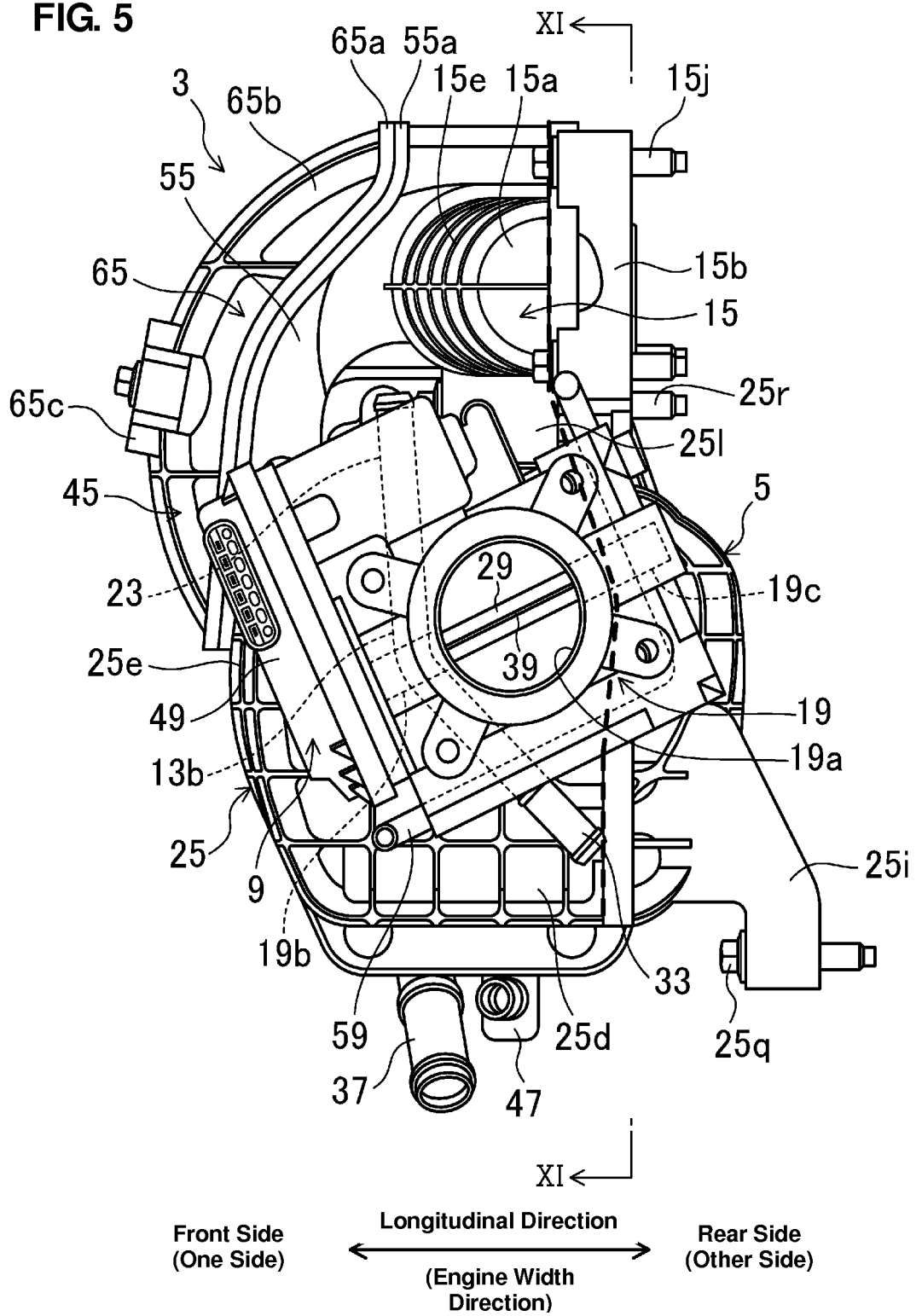
FIG. 5 is a side view of the intake device, when viewed from one side in the engine longitudinal direction.
Figure 6:
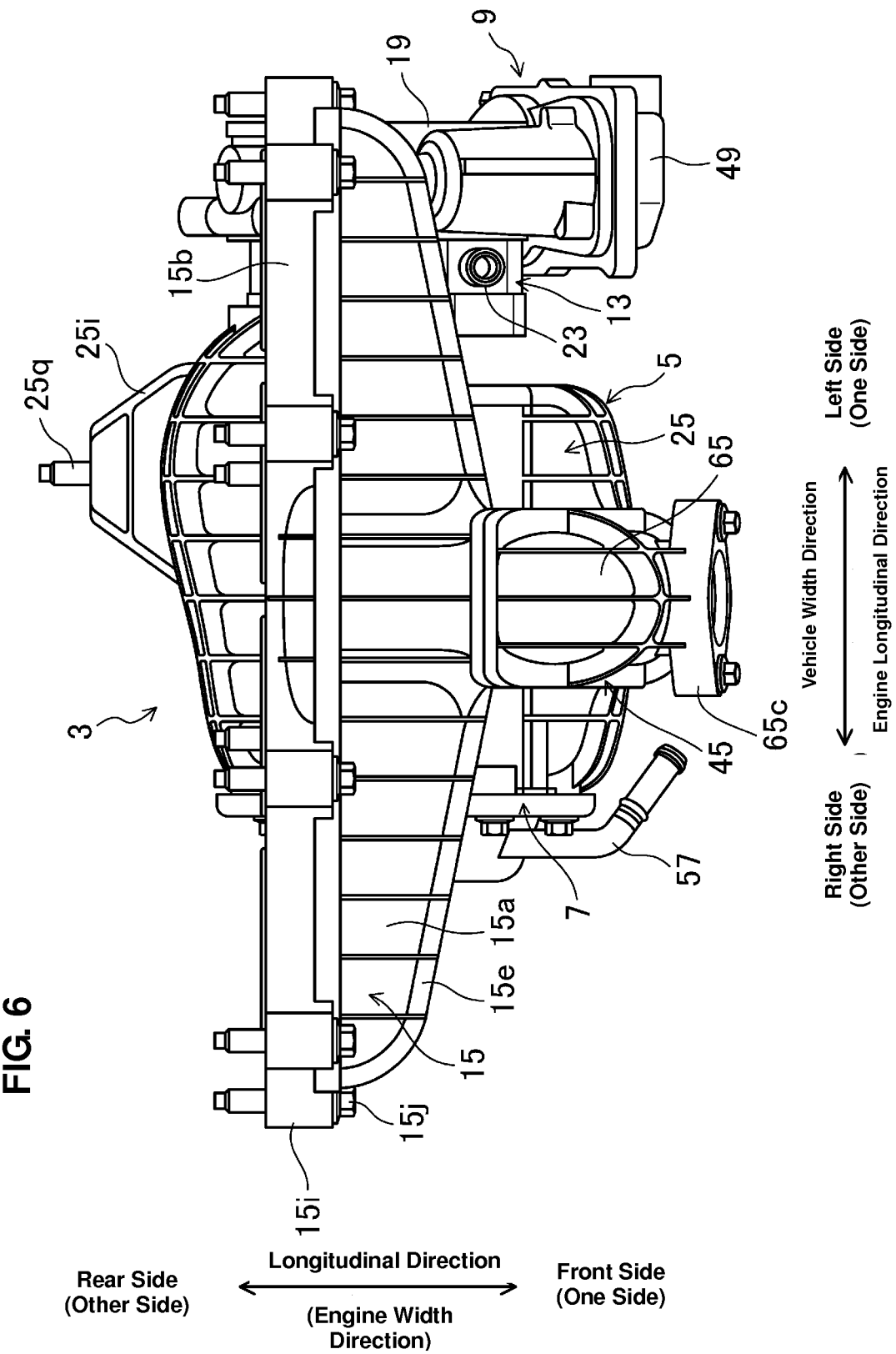
FIG. 6 is an upper view of the intake device.
Figure 7:
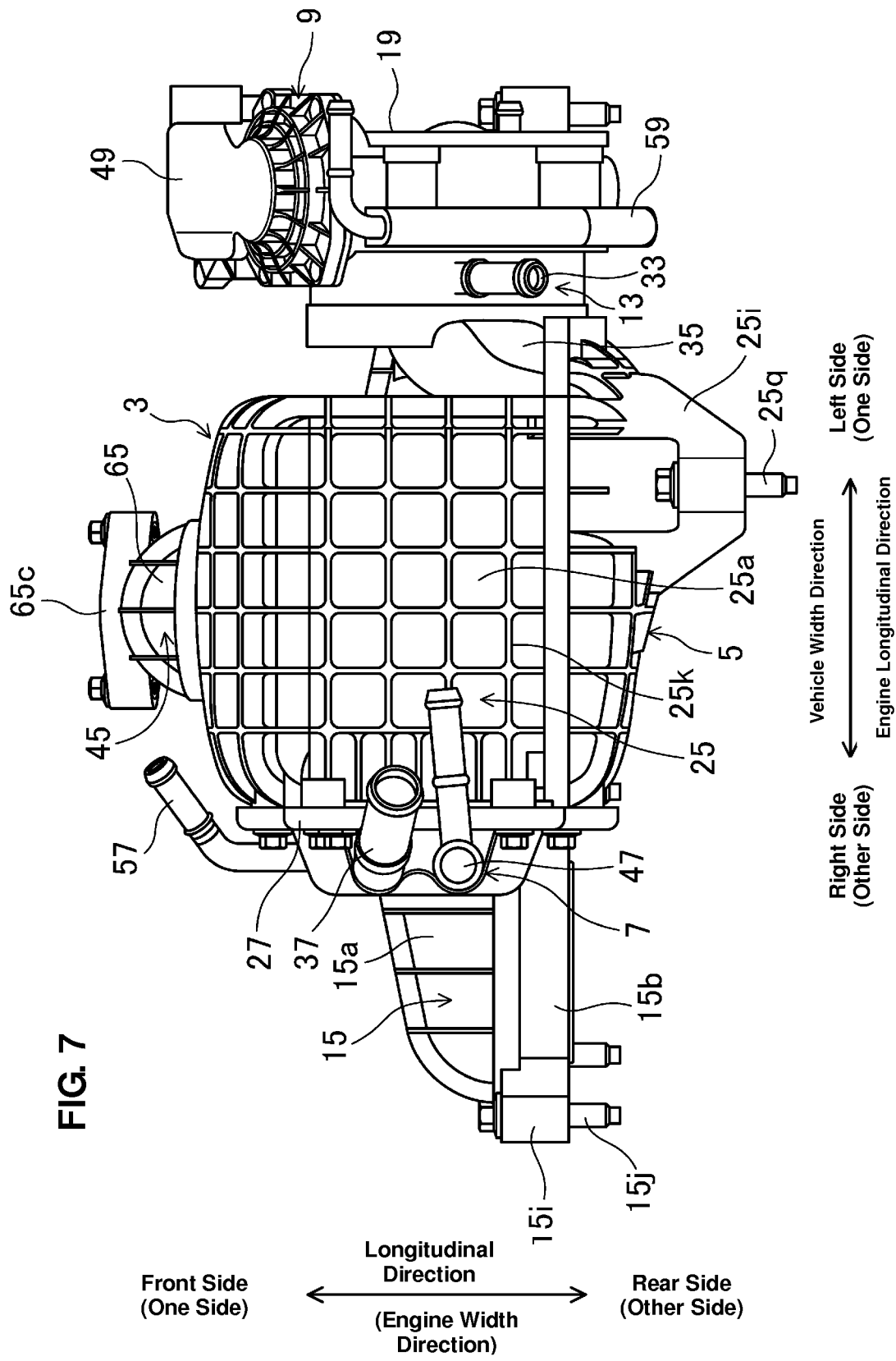
FIG. 7 is a bottom view of the intake device.
Figure 8:
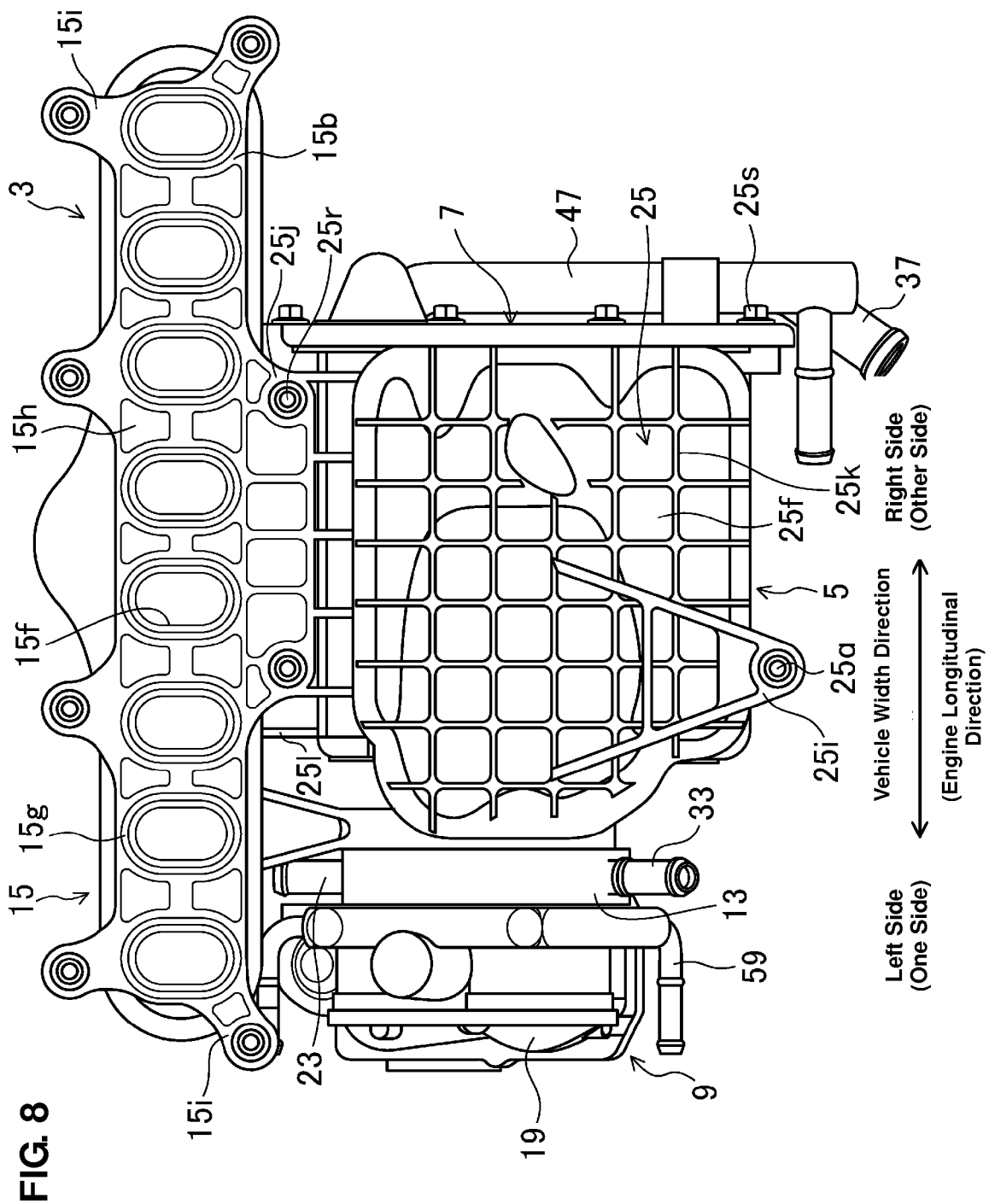
FIG. 8 is a back view of the intake device.
Figure 9:
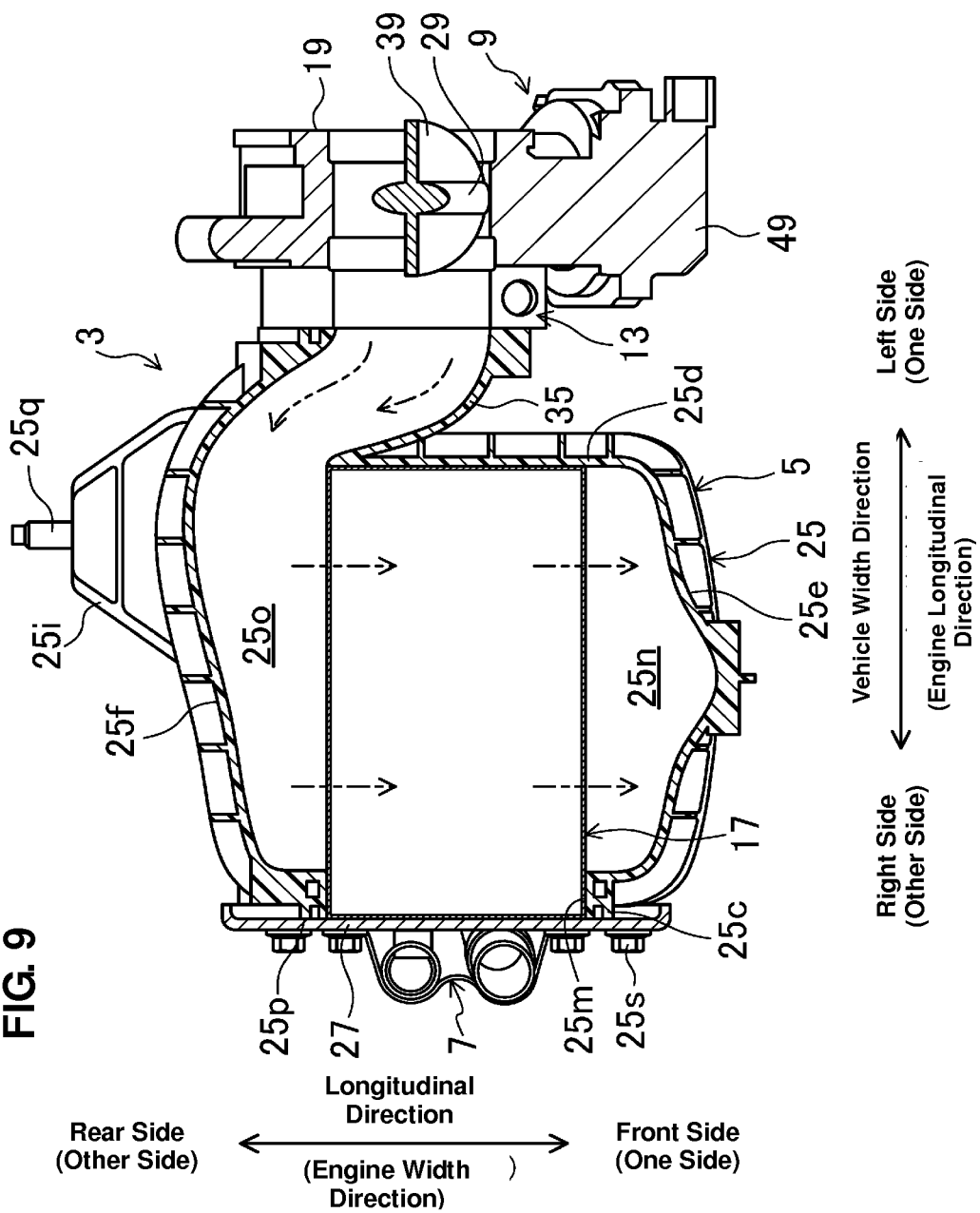
FIG. 9 is a sectional view taken along line IX-IX of FIG. 3.
Figure 10:
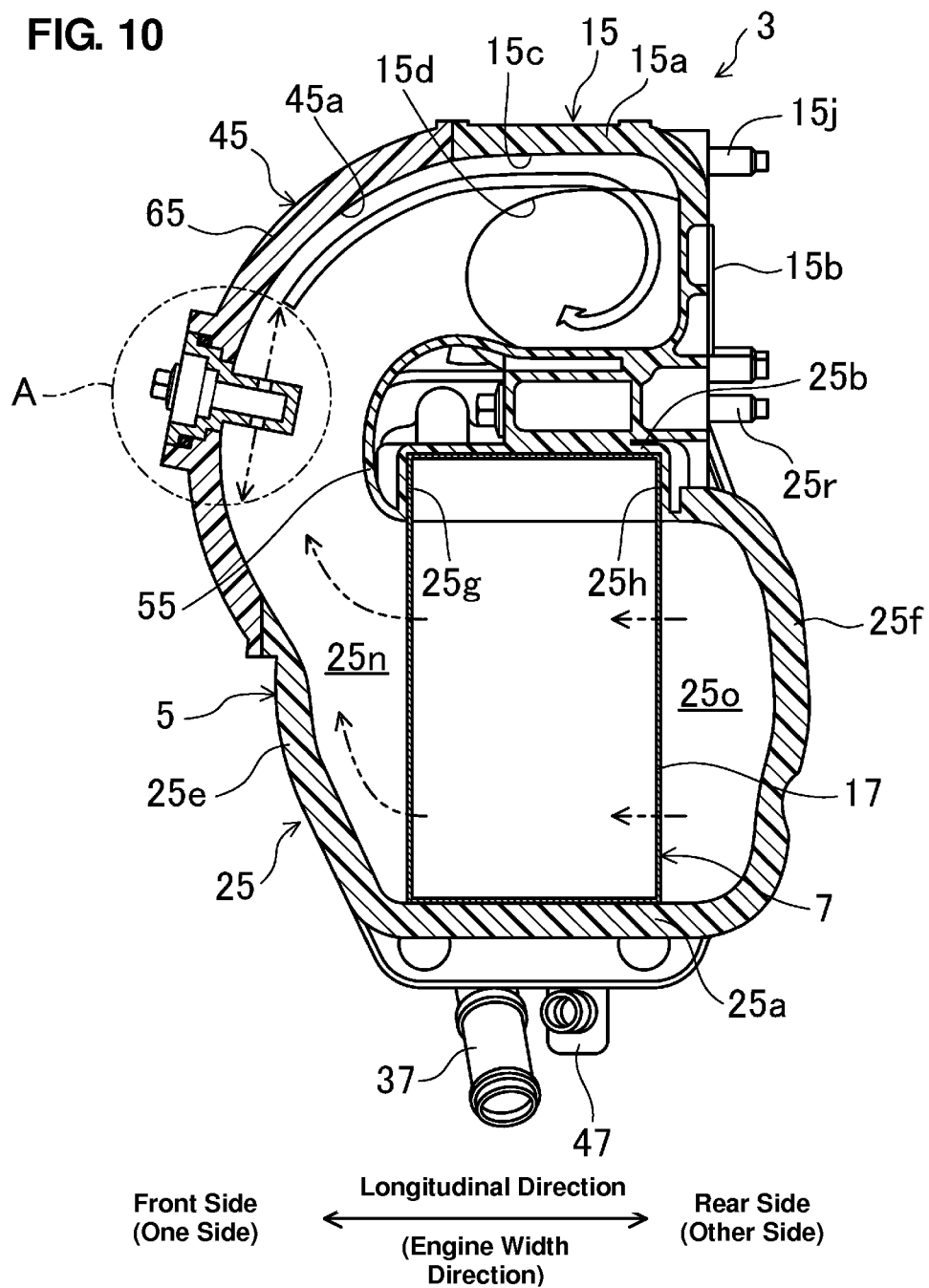
FIG. 10 is a sectional view taken along line X-X of FIG. 3.
Figure 11:
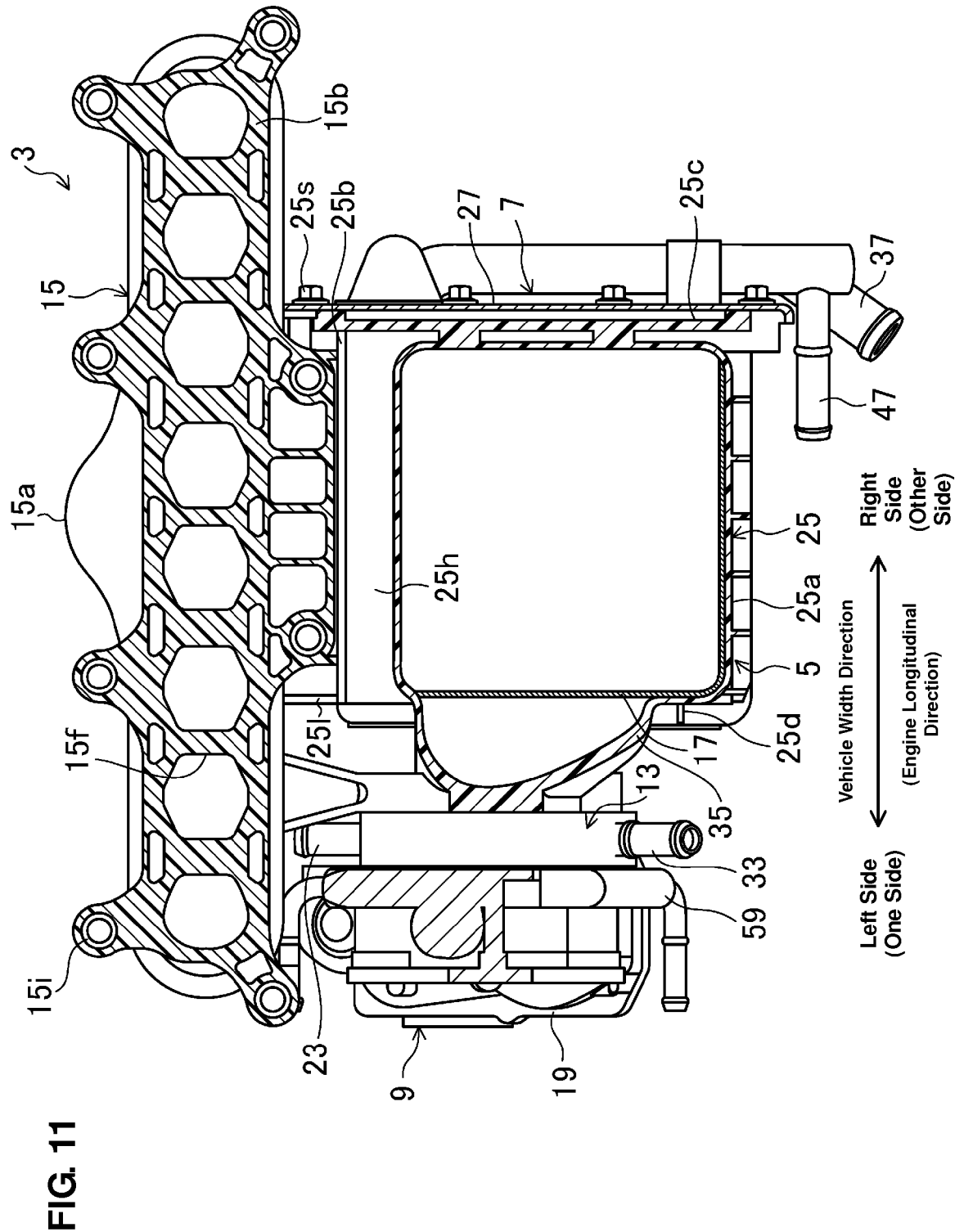
FIG. 11 is a sectional view taken along line XI-XI of FIG. 3.

Next, respective portions of the intake device 3 will be described. FIG. 3 is an elevational view of the intake device, FIG. 4 is a side view of the intake device, when viewed from the right side, FIG. 5 is a side view of the intake device, when viewed from the left side, FIG. 6 is an upper view of the intake device, FIG. 7 is a bottom view of the intake device, FIG. 8 is a back view of the intake device, FIG. 9 is a sectional view taken along line IX-IX of FIG. 3, FIG. 10 is a sectional view taken along line X-X of FIG. 3, and FIG. 11 is a sectional view taken along line XI-XI of FIG. 3. This intake device is, as described above, equipped with the intake control-valve unit 9, the spacer member 13, the intake manifold 5, and the intercooler 7.

The intake control-valve unit 9, which is a motor-driven type, comprises, as shown in FIG. 5, a metal-made throttle body 19 equipped with a penetration hole 19a which has a circular cross section and forms part of the intake passage, a valve shaft 29 which is pivotally supported at both-side valve-shaft support portions 19b, 19c of the throttle body 19, a circular valve body 39 which is fixed to the valve shaft 29 and rotates according to a rotational move of the valve shaft 29 so as to open or close the intake passage, and a drive transmission portion 49 which stores a drive motor (not illustrated) rotatable in both directions and a transmission mechanism portion (not illustrated) to transmit a drive force of the drive motor to the valve shaft 29 in a metal-made housing. Herein, reference numeral 59 denotes a control-valve heating water passage, which is formed at the intake control-valve unit 9 to circulate heating water in an engine cooling water circulation system in order to prevent icing of the valve-shaft support portion 19c during a cold time. This control-valve heating water passage 59 extends rearward along a bottom face of the throttle body 19 as shown in FIG. 7, and extends upward, passing in the vicinity of the valve-shaft support portion 19c, as shown in FIG. 8.

The intake control-valve unit 9 operates the drive motor with a drive current which is controlled by a computer based on signals of an accelerator sensor, a rotational speed sensor and others, not illustrated. The drive force is transmitted to the valve shaft 29 via the transmission mechanism portion, and the valve body 39 fixed to the valve shaft 29 rotates so as to open or close the intake passage, thereby controlling the amount of intake air supplied to the intake ports 21 of the engine 1.

Figure 12:
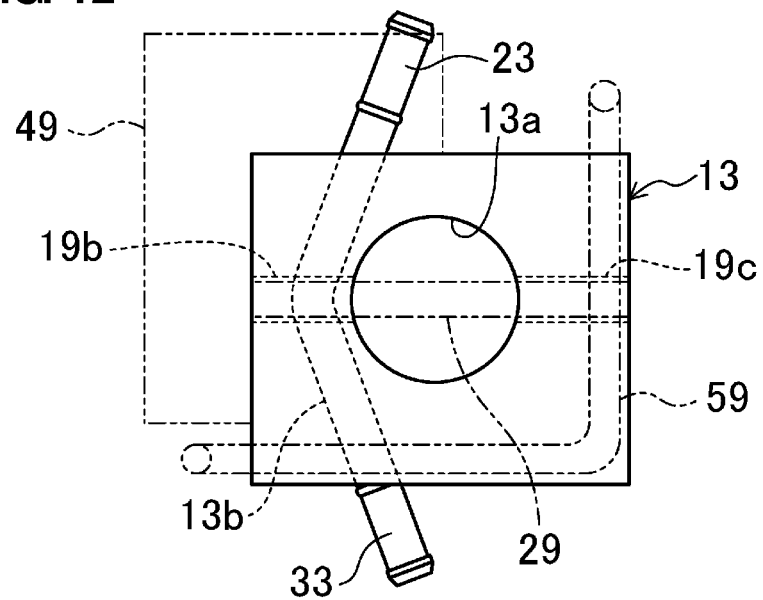
FIG. 12 is a view of a spacer member, when viewed along an intake-air flow direction.

The spacer member 13 is made from metal, and has an intake connection passage portion 13a at its center, which has a circular cross section to pass the intake air therethrough, as shown in FIG. 12. As described above, this spacer member 13 is provided between the intake control-valve unit 9 and the intake manifold 5 so as to interconnect a downstream end portion of the throttle body 19 and the upstream intake pipe portion 35 of the intake manifold 5, whereby the throttle body 19 connects to the upstream intake pipe portion 35.

In many types of intake system of the engine, an intercooler is located upstream of an throttle body. According to the present embodiment, since the intercooler 7 is installed in the intake manifold 5, the intercooler 7 is located downstream of the throttle body 19. Thus, the intake air having the high temperature which is compressed in the compressor chamber of the supercharger 91 passes through the throttle body 19, without being cooled by the intercooler 7. In this case, there is a concern that the drive motor and the transmission mechanism portion of the drive transmission portion 49 may be heated excessively (overheat).

Therefore, the spacer member 13 has a water passage to circulate the cooling water therein to restrain this overheat of the drive transmission portion 49. Specifically, an inner water passage 13b to flow the cooling water therein is formed at a joint portion of the spacer member 13 to the intake control-valve unit 9 which is located on the side of the drive transmission portion 49 relative to the intake connection passage portion 13a. More specifically, as shown in FIG. 5, this inner water passage 13b extends downward substantially straightly, then bends at a central portion, in a height direction, of the spacer member 13, and extends to slant downward and toward the engine 1. As shown in FIG. 12, the inner water passage 13b overlaps not only the drive transmission portion 49 but the valve-shaft support portion 19b of the intake control-valve unit 9 which is located on the side of the drive transmission portion 49.

Thus, since the cooling water introduced through a cooling-water introduction pipe 23 which connects to an upper end portion of the inner water passage 13b formed in the spacer member 13 flows downward, cooling the drive transmission portion 49, and then flows out of a cooling-water discharge pipe 33 which connects to a lower end portion of the inner water passage 13b, overheating of the drive transmission portion 49 can be properly restrained, without specializing the drive transmission portion 49 (without forming an inner water passage in the drive transmission portion 49, or without using a drive motor having a high heat resistance).

Herein, the cooling water circulating in the intercooler cooling-water system, not illustrated, may be used as the cooling water for flowing in the inner water passage 13b. In this case, the cooling of the drive transmission portion 49 can be promoted by the low-temperature cooling water flowing in the intercooler cooling-water system, and the icing of the valve-shaft support portion 19c on the side of the engine 1 can be effectively prevented by the high-temperature cooling water of the engine cooling-water circulation system flowing in the control-valve heating water passage. Further, in a case in which the intake control-valve unit 9 does not include the control-valve heating water passage 59, cooling water flowing in the engine cooling-water circulation system, not illustrated, may be used as the cooling water for flowing in the inner water passage 13b. In this case, the intake control-valve unit 9 can be cooled by the cooling water flowing in the engine cooling-water circulation system, and since the inner water passage 13b overlaps the valve-shaft support portion 19b on the side of the drive transmission portion 49, when viewed along the intake-air flow direction, as described above, the icing of the valve-shaft support portion 19b can be prevented by the high-temperature cooling water of the engine cooling-water circulation system.

The intake manifold 5 is made from the 35% glass-fiber reinforcing polyamide 66 resin (PA66-GF35), and comprises, as shown in FIGS. 3-11, the downstream branch pipe portion 15 which connects to the respective cylinders 11a, 11b, 11c, 11d, a chamber portion 25 which is positioned below the downstream branch pipe portion 15, an upstream intake pipe portion 35 which connects to the chamber portion 25, and an intermediate intake pipe portion 45 which interconnects the chamber portion 25 and the downstream branch pipe portion 15, which is fixedly fastened to an outer face of an intake side of the engine 1 by nine bolts as described later. Thus, the chamber portion 25 is located downstream of the upstream intake pipe portion 35, the intermediate intake pipe portion 45 is located downstream of the chamber portion 25, and the downstream branch pipe portion 15 is located downstream of the intermediate intake pipe portion 45. Hereafter, the intake manifold 5 and the intercooler 7 installed in the intake manifold 5 will be described in order from an upstream side.

The upstream intake pipe portion 35 extends toward the left side from the chamber portion 25, and connects to the throttle body 19 via the spacer member 13 at its left end portion. In other words, as shown in FIG. 9, the upstream intake pipe portion 35 curves toward the outer face of the intake side of the engine 1 from a downstream-side end portion of the spacer member 13 and extends toward the right side, and connects to the chamber portion 25 at the rear side (the outerface side of the engine 1) of the chamber portion 25.

The chamber portion 25 comprises, as shown in FIGS. 9-11, a bottom wall portion 25a which is of a substantially rectangular shape having a long side in the engine longitudinal direction, a top wall portion 25b which is of a substantially rectangular shape and provided above and face to the bottom wall portion 25a, a first side wall portion 25c which extends upward from a right-side side edge portion of the bottom wall portion 25a and connects to the right-side side edge portion of the top wall portion 25b at an upper end thereof, a second side wall portion 25d which extends upward from a left-side side edge portion of the bottom wall portion 25a and connects to the left-side side edge portion of the top wall portion 25b at the upper end thereof, a front-side vertical wall portion 25e which curves forward from a front-side side edge portion of the bottom wall portion 25a and extends upward, a rear-side vertical wall portion 25f which curves rearward from a rear-side side edge portion of the bottom wall portion 25a and extends upward, a front-side extension wall portion 25g which extends further from an upper end portion of the front-side vertical wall portion 25e and connects to a front-side side edge portion of the top wall portion 25b at an upper end portion thereof, and a rear-side extension wall portion 25h which extends further from an upper end portion of the rear-side vertical wall portion 25f and connects to a rear-side side edge portion of the top wall portion 25b at an upper end portion thereof.

As shown in FIG. 9, the front-side vertical wall portion 25e connects to a front-side side edge portion of the first side wall portion 25c at a right-side side edge portion thereof, and connects to a front-side side edge portion of the second side wall portion 25d at a left-side side edge portion thereof, and curves forward when viewed in a vertical direction. Thus, the front-side vertical wall portion 25e curves forward when viewed in the engine longitudinal direction as well as in the vertical direction. In other words, the front-side vertical wall portion 25e is configured such that the face thereof which connects to the front-side side edge portions of the bottom wall portion 25a, the first side wall portion 25c, and the second side wall portion 25d and the lower end portion of the front-side extension wall portion 25g projects forward. Herein, a connection hole which connects to the intermediate intake pipe portion 45 is formed at the upper end portion of the front-side vertical wall portion 25e.

Meanwhile, as shown in FIG. 9, the rear-side vertical wall portion 25f connects to a rear-side side edge portion of the first side wall portion 25c at a right-side side edge portion thereof, and connects to the upstream intake pipe portion 35 at a left-side side edge portion thereof, and curves rearward when viewed in the vertical direction. Thus, the rear-side vertical wall portion 25f curves forward when viewed in the engine longitudinal direction as well as in the vertical direction. In other words, the rear-side vertical wall portion 25f is configured such that the face thereof which connects to the rear-side side edge portions of the bottom wall portion 25a and the first side wall portion 25c, and the lower end portion of the rear-side extension wall portion 25h projects rearward.

The chamber portion 25 is configured as described above, so that a space portion enclosed with the bottom wall portion 25a, the top wall portion 25b, the first side wall portion 25c, the second side wall portion 25d, the front-side vertical wall portion 25e, the rear-side vertical wall portion 25f, the front-side extension wall portion 25g, and the rear-side extension wall portion 25h is formed inside the chamber portion 25 as shown in FIGS. 9-11. Further, by providing the front-side extension wall portion 25g and the rear-side extension wall portion 25h and the like, the vertical length of a central portion of the chamber portion 25 is made greater (longer) than the engine-longitudinal-direction length and the engine-width-direction length of the central portion of the chamber portion 25. Accordingly, its inner hollow section (see FIG. 11) when viewed from the engine width direction is greater (wider) than its inner hollow section (see FIG. 9) when viewed from the engine vertical direction, and its inner hollow section (see FIG. 10) when viewed from the engine longitudinal direction.

The chamber portion 25 includes, as shown in FIG. 8, an attaching bracket 25i which is formed at a lower end portion of the rear-side vertical wall portion 25f and has a bolt through hole, and an attachment portion 25j which is formed at an upper side of the top wall portion 25b and has two bolt through holes. The chamber portion 25 is fixedly fastened to the outer face of the inside side of the engine 1 at its lower end portion via the attaching bracket 25i with a single bolt 25q and at its upper end portion via the attachment portion 25j with two bolts 25r. In the figures, reference character 25k denotes ribs to increase the rigidity of the chamber portion 25, and reference character 25l denotes ribs to rigidly connect the chamber portion 25 and the downstream branch pipe portion 15.

Figure 13:
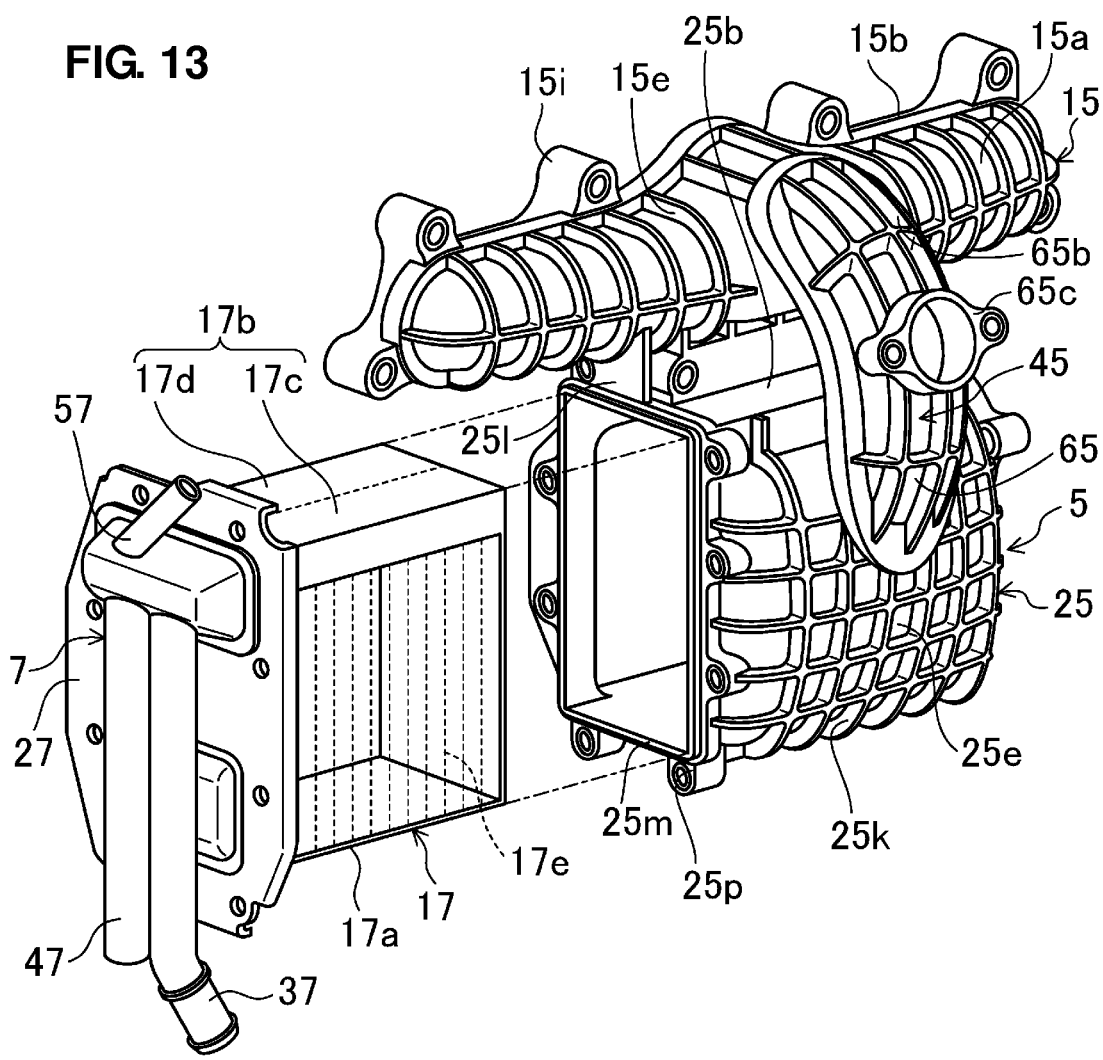
FIG. 13 is a perspective view showing an intake manifold and an intercooler.

As shown in FIG. 13, a rectangular opening portion 25m having a long side in the vertical direction is formed at the first side wall portion 25c of the chamber portion 25 (on the opposite side to the upstream intake pipe portion 35), and the intercooler 7 is installed in the above-described apace portion formed in the chamber portion 25, by being inserted through this rectangular opening portion 25m.

The intercooler 7 is a water cooling type of intercooler and, as shown in FIGS. 4 and 13, comprises an intercooler body portion 17, a cooling-water introduction pipe 37 to supply the cooling water to the intercooler 7, a cooling-water discharge pipe 47 to discharge the heated cooling water from the intercooler 7, and an intercooler attachment portion 27 connecting to a right-side side face of the intercooler body portion 17 and supporting the cooling-water introduction pipe 37 and the cooling-water discharge pipe 47. In the figures, reference character 57 denotes a pipe to release air contained in the cooling water.

The intercooler body portion 17 has a rectangular-parallelepiped shape and its front and rear faces which have the widest face-area (a pair of faces which faces to each other in the engine width direction). The intercooler body portion 17 includes a rectangular-parallelepiped-shaped core portion 17a and a tank portion 17b provided above the core portion 17a. Herein, not only the intercooler body portion 17 but also the core portion 17a has front and rear faces, i.e., intake passing faces, which have the widest face-area.

Plural flat-shaped water tubes 17e, which are made of a thin plate, are arranged in the engine longitudinal direction at the core portion 17a as shown in FIG. 13. Although illustration is omitted here, some corrugated fins are joined to an outer wall face of each of the water tubes 17e by soldering or the like. Thereby, the surface area of the water tube 17e is enlarged, thereby improving the radiation of heat. The tank portion 17b comprises an inlet tank 17c and an outlet tank 17d, and these tanks 17c, 17d are connected to the water tubes 17e. Thus, the cooling water introduced through the cooling-water introduction pipe 37 is supplied into the inlet tank 17c, and then flows down through the water tubes 17e and cools the intake air having the high temperature. The cooling water heated through the heat exchange with the intake air having the high temperature is supplied into the outlet tank 17d, and then flows out of the cooling-water discharge pipe 47. Herein, the cooling-water introduction pipe 37 and the cooling-water discharge pipe 47 connect to the intercooler cooling-water circulation system.

The intercooler body portion 17 is inserted into the chamber portion 25 through the rectangular opening portion 25m such that the inside of the chamber portion 25 is divided into two parts longitudinally (in the engine width direction). More specifically, as shown in FIGS. 9-11, the intercooler body portion 17 inserted through the rectangular opening portion 25m is installed in the chamber portion 25 so as to partition the inside space of the chamber portion 25 longitudinally in a state in which its upper face and a lower face of the top wall portion 25b are located substantially at the same level, its lower face and an upper face of the bottom wall portion 25a are located substantially at the same level, its left-side side face and an inner face of the second side wall portion are located substantially at the same level, and the tank portion 17b is positioned between the front-side extension wall portion 25g and the rear-side extension wall portion 25h. Thereby, a front-side space portion 25n is formed between the front-side vertical wall portion 25e which curves forward and the front face of the core portion 17a of the intercooler body portion 17, and a rear-side space portion 25o, which has substantially the same volume as the front-side space portion 25n, is formed between the rear-side vertical wall portion 25f which curves rearward and the rear face of the core portion 17a of the intercooler body portion 17.

The intercooler 7 is installed in the intake manifold 5 by fixedly fasten the intercooler attachment portion 27 to a peripheral portion 25p of the rectangular opening portion 25m of the chamber portion 25 with eight bolts 25s in a state in which the intercooler body portion 17 is stored in the chamber portion 25 as described above as shown in FIG. 4. Spaces between the outer face of the intercooler body portion 17 stored in the chamber portion 25, the lower face of the top wall portion 25b, the inner face of the second side wall portion 25d, the upper face of the bottom wall portion 25a, and an inner peripheral face of the rectangular opening portion 25m are sealed with sealing members, such as packing, so as to prevent air from leaking from a space between the front-side space portion 25n and the rear-side space portion 25c. Herein, the intercooler body portion 17 and the chamber portion 25 are not fixed to each other, and the intercooler 7 is fixed to the chamber portion 25 only at the peripheral portion 25p.

Since the intercooler 7 is installed in the chamber portion 25 of the intake manifold 5 and therefore it is not necessary that the intercooler 7 is arranged in the engine room, the intake device 3 according to the present embodiment can make the engine room properly compact, compared with a case in which the intercooler 7 is not installed in the intake manifold 5. Moreover, the intake device 3 equipped with the chamber portion 25 and the intercooler 7 described above according to the present embodiment have the following advantages.

That is, the alternator 41 is provided beside, on the right side of the chamber portion 25 as shown in FIG. 1, so that the chamber portion 25 influences the longitudinal length of the engine greatly. According to the chamber portion 25 of the present embodiment, the vertical length of the central portion of the chamber portion 25 is made greater (longer) than the engine-longitudinal-direction length and the engine-width-direction length of the central portion of the chamber portion 25 as described above, in other wards, the greater (wider) face is ensured in the vertical direction which provides less influence on the longitudinal length of the engine. Therefore, the greater (wider) inner hollow section when viewed from the engine width direction can be ensured, making the engine room properly compact. Further, by installing the rectangular-parallelepiped-shaped intercooler body portion 17 having the widest area of the intake passing area facing to the engine width direction in the camber portion 25 having the greater (wider) inner hollow section when viewed from the engine width direction, the intake device 3 according to the present embodiment can effectively ensure the area of the intake passing face, restraining the intercooler from being improperly long.

Meanwhile, as described above, the intake control-valve unit 9 including the metal-made throttle body 19 is attached to the intake manifold 5 (the upstream intake pipe portion 35) via the spacer member 13, so that the gravity center of the whole of the intake manifold 5 including the intake control-valve unit 9 and the spacer member 13 is offset leftward. When the engine 1 vibrates in this state of the offset gravity center, the intake manifold 5 and the intake control-valve unit 9 also vibrate accordingly. Herein, the intake manifold 5 vibrates considerably due to the above-described imbalance of the gravity center, thereby increasing the stress generating at the resin-made intake manifold 5, so that it may be necessary to reinforce the intake manifold by increasing the thickness thereof or the number of reinforcing ribs.

Herein, according to the chamber portion 25 of the present embodiment, the intercooler attachment portion 27 supporting the heavy components containing the cooling water therein, such as the cooling-water introduction pipe 37 and the cooling-water discharge pipe 47, is fixedly fastened to the peripheral portion 25p of the rectangular opening portion 25m formed at the first side wall portion 25c located on the right side. Thereby, the gravity center of the whole of the intake manifold 5 including the intake control-valve unit 9 and the intercooler 7 can be closer to the gravity center of the intake manifold 5 itself, compared with a case in which only the intake control-valve unit 9 is connected to the intake manifold 5. Accordingly, any vibration caused by the imbalance can be restrained, so that no additional reinforcement may be necessary.

Subsequently, the intermediate intake pipe portion 45 will be described. The intermediate intake pipe portion 45 constitutes a single passage which connects the front-side space portion 25n of the chamber portion 25 to the downstream branch pipe portion 15, which is different from a conventional structure in which a surge tank and plural cylinders are connected via plural intake branch pipes. As shown in FIGS. 3-5, and 10, the intermediate intake pipe portion 45 curves forward (outward in the engine width direction) and extends upward from the upper end portion of the front-side vertical wall portion 25e of the chamber portion 25, and connects to a branch pipe body portion 15a of the downstream branch pipe portion 15, which will be described below. Thus, an inner passage 45a which has a circular cross section and curves forward and extends vertically is formed at the intermediate intake pipe portion 45, and the front-side space portion 25n of the chamber portion 25 and a collective portion 15c of the downstream branch pipe portion 15, which will be described below, are connected via the inner passage 45a. Accordingly, as shown in FIG. 10, after hitting against the inside face of the front-side vertical wall portion 25e, the intake air passing through the intercooler body portion 17 flows upward inside the inner passage 45a along an outer-peripheral-circular-side face of the inner passage 45a.

Further, as shown in FIGS. 4 and 5, the intermediate intake pipe portion 45 has a divisional structure which has an inside wall portion 55 and an outside wall portion 65. The inside wall portion 55, constitutes a rear-side half of the intermediate intake pipe portion 45, is formed integrally with the chamber portion 25 and the downstream branch pipe portion 15. The outside wall portion 65, constitutes a front-side half of the intermediate intake pipe portion 45, is formed separately from the chamber portion 25 and the downstream branch pipe portion 15. The outside wall portion 65 is attached to the inside wall portion 55 by welding a flange portion 55a formed at the inside wall portion 55 to a flange portion 65a formed at the outside wall portion 65.

The above-described EGR-gas introduction pipe 93 is connected to the outside wall portion 65. More specifically, a flange portion 65c for fastening the EGR-gas introduction pipe 93 with bolts is formed at a central portion of the outside wall portion 65. The flange portion 65c has an attachment hole 65d for attaching a nozzle member 43 which penetrates up to the inner passage 45a. In the figures, reference character 65b denotes ribs to increase the rigidity of the outside wall portion 65.

Figure 14A:
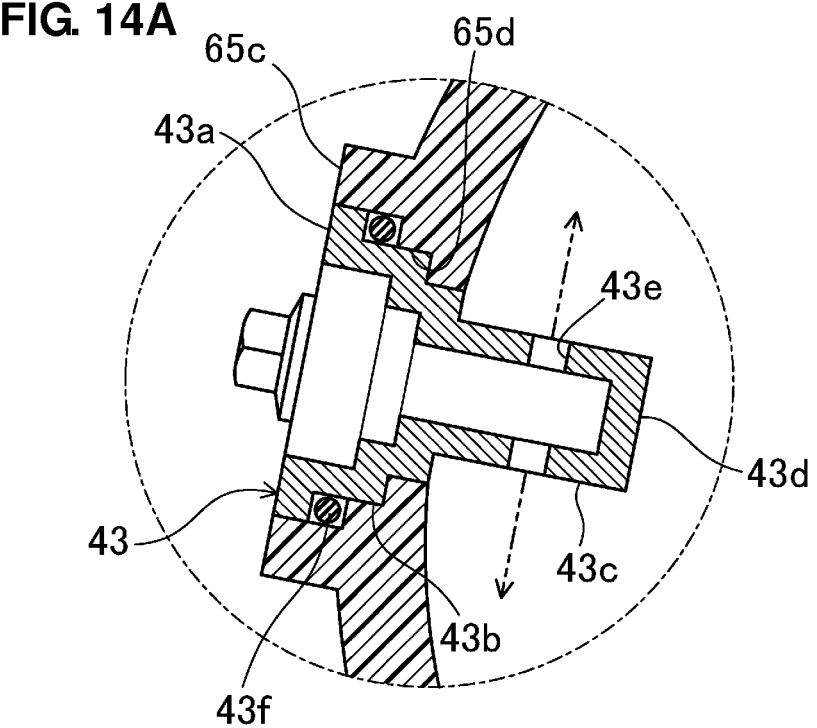
FIG. 14A is an enlarged view of an A portion in FIG. 10.
Figure 14B:
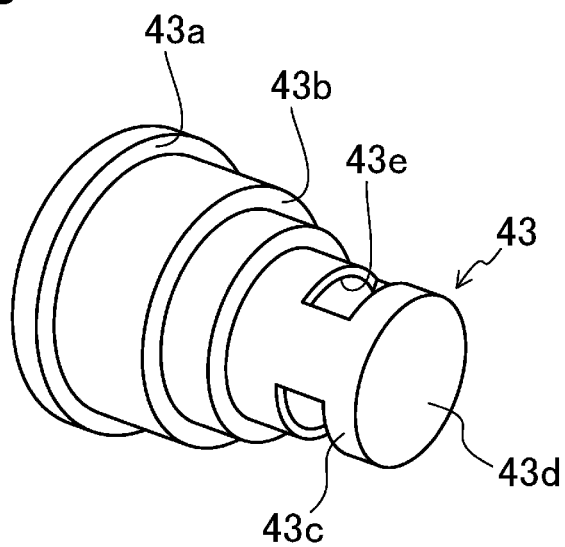
FIG. 14B is a perspective view of a nozzle member.

The nozzle member 43, which is a metal-plate press product, comprises, as shown in FIGS. 14A and 14B, a ring-shaped flange portion 43a, a cylindrical attachment portion 43b which extends from an inner-peripheral edge portion of the flange portion 43a perpendicularly to the flange portion 43a and has a step portion, a cylindrical nozzle tip portion 43c which extends further from a tip of the attachment portion 43b, and a closing portion 43d which closes a tip of the nozzle tip portion 43c. This nozzle member 43 is formed in a cylindrical shape with a floor. A pair of opening portions 43e which face to each other in a diameter direction is formed at the nozzle tip portion 43c. Meanwhile, at a wall face partitioning the attachment hole 65d is formed a step portion which is configured to correspond to a contour of the nozzle member 43. The nozzle member 43 is inserted into the attachment hole 65d in a state in which an O ring for sealing 43f is located between the flange portion 43a of the nozzle member 43 and a step face of the attachment hole 65d and a pair of opening portions 43e faces to each other vertically.

The nozzle member 43 is attached to the outside wall portion 65 described above, so that when the EGR gas is introduced through the EGR-gas introduction pipe 9, the EGR gas passing through the inside of the nozzle member 43 hits against the closing portion 43d closing the nozzle tip portion 43c, as shown in FIGS. 10 and 14A, and then flows out of the pair of opening portions 43e dividedly vertically. Thus, the EGR gas disperses vertically in the vicinity of the outside wall portion 65 (precisely, in the vicinity of the outer-peripheral-circular-side face of the inner passage 45a). Herein, since the intake air passing through the intercooler body portion 17 flows upward inside the inner passage 45a along the outer-peripheral-circular-side face of the inner passage 45a as described above and thereby mixing of the intake air with the EGR gas is promoted, the mixing of the EGR gas can be improved. Since the EGR gas introduced into the inner passage 45a has a high temperature and the intake manifold 5 is made of resin, a heat-resistant inner layer (not illustrated) which is made from the 35% glass-fiber reinforcing polyphthalamide resin (PPA-GF35) is provided at an inner face of the outside wall portion 65 of the intermediate intake pipe portion 45 where the EGR gas disperses.

As shown in FIG. 1, the downstream branch pipe portion 15 extends in the engine longitudinal direction above the alternator 41, covering the eight intake ports 21 of the four cylinders 11a, 11b, 11c, 11d, and comprises the branch pipe body portion 15a which forms the inner passage for distributing the intake air into the respective cylinders 11a, 11b, 11c, 11d and a flange portion 15b for attaching the downstream branch pipe portion 15 to the cylinder head 1b. Herein, in the figures, reference character 15e denotes ribs to increase the rigidity of the branch pipe body portion 15a.

The branch pipe body portion 15a is formed to project forward and has a half-oval cross-section contour, when viewed from the longitudinal direction, as shown in FIGS. 4 and 5. This branch pipe body portion 15a is configured, as shown in FIG. 6, such that the sectional heights, in the lateral direction and the vertical direction, of its central portion are greater than that of its longitudinally both-side portions so as to ensure the collective portion 15c (see FIG. 10) which is wider than the cross section of an inner passage 15d, which will be described, for increasing the mixing of the intake air introduced from the intermediate intake pipe portion 45 with the EGR gas.

Figure 15:
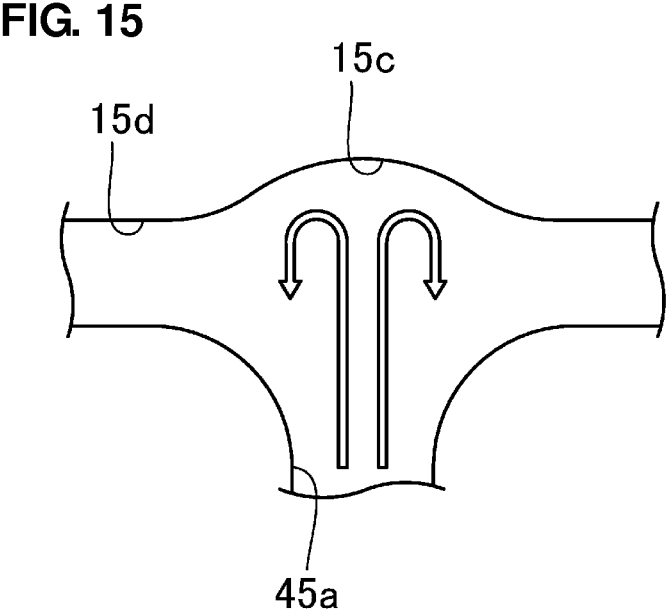
FIG. 15 is a diagram schematically showing a connection portion of a collective portion to an inner passage at a downstream branch pipe portion.

Meanwhile, the inner passage 15d (see FIG. 10) formed at the branch pipe body portion 15a is configured such that its cross section becomes gradually greater toward the collective portion 15c from the both ends in the engine longitudinal direction, and gently connects to the collective portion 15c as shown in FIG. 15. Accordingly, the intake air and the EGR gas hits against the flange portion 15b of the collective portion 15c once as shown by arrows in FIGS. 10 and 15 and gets mixed inside the collective portion 15c, and then flows into the inner passage 15d. Thereby, the EGR gas is supplied not only to the second and third cylinders 11*b*, 11*c* but also to the first and fourth cylinders 11*a*, 11*d*, so that the distribution of the EGR gas can be improved.

The flange portion 15*b* is provided behind the branch pipe body portion 15*a*, and is formed in an oval shape, when viewed from the lateral direction. As shown in FIG. 8, eight intake opening portions 15*f* are formed at a specified position of the flange portion 15*b* which corresponds to the eight intake ports 21, and the eight intake opening portions 15*f* connect to the collective portion 15*c* or the inner passage 15*d*. In FIG. 8, reference character 15*g* denotes an O ring as sealing means located between the flange portion and the cylinder head 1*b*, and reference character 15*h* denotes a recess portion which is formed to decrease the weight of the downstream branch pipe portion 15.

As shown in FIG. 3, attachment portions 15*i* with bolt through holes are formed at the flange portion 15*b* such that the four thereof are formed at an upper portion of the flange portion 15*b* and the two thereof are formed at a lower portion of the flange portion 15*b*. Further, the above-described two attachment portions 25*j* are formed at the flange portion 15*b*. The downstream branch pipe portion 15 is fixedly fastened to the other face of the intake side of the engine by eight bolts 15*j*, 25*r* inserted into the eight attachment portions 15*i*, 15*j*.

While the intermediate intake pipe portion 45 has the divisional structure which has the outside wall portion 65 formed separately from the chamber portion 25 and the downstream branch pipe portion 15 as described above, not only the outside wall portion 65 but also a member constituting the flange portion 15*b* of the downstream branch pipe portion 15 and the rear-side vertical wall portion 25*f* of the chamber portion 25 are formed separately from other portions of the downstream branch pipe portion 15 and the chamber portion 25 as shown by bold broken lines in FIG. 5. That is, the intake manifold 5 of the present embodiment has a three divisional structure, so that forming and die cutting of the intake manifold 5 can be facilitated even though it has many opening portions and projection portions, thereby a complex structure.

According to the intake device 3 of the present embodiment described above, the intake air having the high temperature compressed in the compressor chamber of the supercharger 91 passes through the throttle body 19 and the space member 13, ad then, as shown in FIG. 9, is introduced into the rear-side space portion 25*o* of the chamber portion 25, passing through the upstream intake pipe portion 35. As shown in FIGS. 9 and 10, the high-temperature intake air introduced into the rear-side space portion 25*o* is cooled by the cooling water flowing in the water tubes 17*e* through the heat exchanging when passing forward through the core portion 17*a* of the water-cooling type of intercooler 7 from behind. This cooled intake air having the increased charging efficiency is introduced into the front-side space portion 25*n*.

Then, as shown in FIG. 10, after hitting against the inside face of the front-side vertical wall portion 25*e*, the intake air passing through the core portion 17*a* of the intercooler 7 flows upward inside the inner passage 45*a* mainly along the outer-peripheral-side face of the inner passage 45*a* (the inside face of the outside wall portion 65), mixes with the EGR gas dispersing vertically in the vicinity of the outside wall portion 65, and then is introduced into the collective portion 15*c* of the downstream branch pipe portion 15. The mixture gas introduced into the collective portion 15*c* hits against the flange portion 15*b* of the collective portion 15*c*, swirls and gets mixed inside the collective portion 15*c*, then flows into the inner passage 15*d*. The mixture gas is finally distributed into the respective cylinders 11*a*, 11*b*, 11*c*, 11*d*.

According to the present embodiment, since the rein-made intake manifold 5 is used, the weight of the intake device can be reduced and the fuel economy (gas millage) can be improved.

Further, since the water-cooling type of intercooler is used, the cooling efficiency can be improved more properly than a case in which the air-cooling type of intercooler is used.

Moreover, since the intercooler body portion 17 formed in the rectangular-parallelepiped shape ensures the wider area in the vertical direction which has less restriction in space, compared with the engine longitudinal direction or the engine width direction, the length or width of the intercooler can be properly restrained from being improperly long or wide, ensuring the desired area.

Also, since the intercooler body portion 17 is installed in the chamber portion 25 so as to divide the inside of the chamber portion 25 in the engine width direction, the intake flow having the high temperature passes through the widest area, so that the intake-air passing area can be ensured effectively.

Further, since the intercooler body portion 17 which is properly compact in the engine longitudinal direction and the engine width direction is inserted into the chamber portion 25 through the rectangular opening portion 25*m*, thereby the water-cooling type of intercooler 7 is installed in the intake manifold 5, the compactness of the engine 1 in the engine longitudinal direction and the engine width direction can be achieved.

Moreover, since the intercooler 7 is fixedly fastened to the peripheral portion 25*p* of the rectangular opening portion 25*m* formed at the opposite side of the chamber portion 25 to the upstream intake pipe portion 35, the gravity center of the whole of intake manifold 5 including the throttle body 19 and the intercooler 7 can be located closer to the gravity center of the intake manifold 5 itself than a case in which only the throttle body 19 is connected to the intake manifold 5. Thereby, the vibration caused by the imbalance can be properly restrained, so that any further reinforcement may not be necessary, thereby avoiding the weight increase of the intake manifold 5 for reinforcement.

Also, since the EGR-gas introduction pipe 93 is connected to the outside wall portion 65 of the intermediate intake pipe portion 45 interconnecting the chamber portion 25 and the downstream branch pipe portion 15, the EGR gas is introduced downstream of the intercooler body portion 17, so that the performance of the intercooler can be restrained from being deteriorated by soot contained in the EGR gas.

Further, since the intermediate intake pipe portion 45 curves forward, the intake-air flow coming up in the intermediate intake pipe portion 45 mainly along the outside wall portion 65 is easily mixed with the EGR gas introduced in the vicinity of the outside wall portion 65, thereby promoting mixing of the EGR gas.

The present invention should not be limited to the above-described embodiment, and any other modifications or improvements may be applied within the scope of a spirit of the present invention.

For example, while it is arranged downstream of the throttle body 19 in the above-described embodiment, the spacer member 13 may be arranged upstream of the throttle body 19.

Further, while the intake manifold 5 is made from the 35% glass-fiber reinforcing polyamide 66 resin in the above-described embodiment, the material of the intake manifold 5 should not be limited to this type of resin as long as it is resin-made one.

Also, while the outside wall portion 65 is formed separately from the chamber portion 25 in the above-described embodiment, the front-side vertical wall portion 25e of the chamber portion 25 may be formed separately from another portion of the chamber portion 25 and the front-side vertical portion 25e and the outside wall portion 65 may be formed integrally.

Moreover, while it is applied to the diesel engine in the above-described embodiment, the intake device 3 may be applied to a gasoline engine.

What is claimed is:

1. An intake device of an engine, comprising:
an intake manifold of the engine having plural cylinders arranged in a line, the intake manifold being provided at an outer face of an intake side of the engine which is one side in an engine width direction, the intake manifold including a downstream branch pipe portion connecting to the respective cylinders, a chamber portion positioned below the downstream branch pipe portion and connecting to the downstream branch pipe portion, and an upstream intake pipe portion connecting to an engine-outer-face-side portion of the chamber portion and extending in an engine longitudinal direction which corresponds to an arrangement direction of the plural cylinders, the chamber portion having a rectangular opening portion having a vertically-long shape which is formed at an opposite side thereof to the upstream intake pipe portion; and
a water-cooling type of intercooler including an intercooler body portion, the intercooler body portion having a rectangular-parallelepiped shape and a pair of faces which has the widest face-area and faces to each other in the engine width direction,
wherein said intercooler body portion of the intercooler is installed in said chamber portion of the intake manifold, by being inserted through said opening portion of the chamber portion, so as to divide an inside of the chamber portion into two parts in the engine width direction thereby.

2. The intake device of an engine of claim 1, wherein said intake manifold is made from resin, said intercooler is fixedly fastened to a peripheral portion of said opening portion of the intake manifold, and a throttle body is connected to said upstream intake pipe portion of the intake manifold.

3. The intake device of an engine of claim 2, wherein said chamber portion and said downstream branch pipe portion of the intake manifold are interconnected to each other via a single intermediate intake pipe portion which curves outward in the engine width direction and extends vertically, and an EGR-gas introduction pipe is connected to an outside wall portion of said intermediate intake pipe portion which is located at an outside position in the engine width direction.

4. The intake device of an engine of claim 1, wherein said chamber portion and said downstream branch pipe portion of the intake manifold are interconnected to each other via a single intermediate intake pipe portion which curves outward in the engine width direction and extends vertically, and an EGR-gas introduction pipe is connected to an outside wall portion of said intermediate intake pipe portion which is located at an outside position in the engine width direction.

* * * * *